(12) United States Patent
Hashizume

(10) Patent No.: US 12,360,007 B2
(45) Date of Patent: Jul. 15, 2025

(54) APPARATUS FOR COLLECTING DATA ON A MECHANCIAL APPARATUS

(71) Applicant: NTN CORPORATION, Osaka (JP)

(72) Inventor: Shohei Hashizume, Kuwana (JP)

(73) Assignee: NTN CORPORATION, Osaka (JP)

( * ) Notice: Subject to any disclaimer, the term of this patent is extended or adjusted under 35 U.S.C. 154(b) by 679 days.

(21) Appl. No.: 17/626,417

(22) PCT Filed: Mar. 24, 2020

(86) PCT No.: PCT/JP2020/013028
§ 371 (c)(1),
(2) Date: Jan. 11, 2022

(87) PCT Pub. No.: WO2021/009973
PCT Pub. Date: Jan. 21, 2021

(65) Prior Publication Data
US 2022/0252482 A1    Aug. 11, 2022

(30) Foreign Application Priority Data

Jul. 12, 2019  (JP) .................................. 2019-129900

(51) Int. Cl.
*G01M 13/04*    (2019.01)
(52) U.S. Cl.
CPC .................................. *G01M 13/04* (2013.01)
(58) Field of Classification Search
CPC .............................. G01M 13/04; G01M 13/045
See application file for complete search history.

(56) References Cited

U.S. PATENT DOCUMENTS 6,486,773 B1 * 11/2002 Bailie .................. B60C 23/0408
340/447
6,794,586 B1 * 9/2004 Mason ............... G01G 19/4144
235/383
2006/0167659 A1   7/2006 Miyasaka et al.
(Continued)

FOREIGN PATENT DOCUMENTS

CN       1688874 A   10/2005
CN     107003212 A    8/2017
(Continued)

OTHER PUBLICATIONS

International Search Report issued in corresponding International Patent Application No. PCT/JP2020/013028, dated Jun. 16, 2020, with English translation.

*Primary Examiner* — Randy W Gibson
(74) *Attorney, Agent, or Firm* — Rimon P.C.

(57) ABSTRACT

A data collection apparatus includes an input portion to which a result of detection (heat flux) by a heat flux sensor provided in a beating is provided and a controller configured to collect the result of detection by the sensor provided to the input portion in prescribed sampling cycles for storage. When magnitude of the heat flux is smaller than a switching threshold value, the controller sets the sampling cycle to a first cycle, and when magnitude of the heat flux is larger than the switching threshold value, the controller switches the sampling cycle to a second cycle shorter than the first cycle and determines whether or not there is a sign of abnormality of the bearing based on a rate of change in heat flux collected in the second cycles.

10 Claims, 17 Drawing Sheets

(56) References Cited

U.S. PATENT DOCUMENTS

| | | | |
|---|---|---|---|
| 2010/0259434 A1* | 10/2010 | Rud | H03M 1/08 |
| | | | 340/584 |
| 2016/0246396 A1* | 8/2016 | Dickinson | G06F 3/043 |
| 2017/0041205 A1* | 2/2017 | Rangel | H04L 43/024 |
| 2017/0291204 A1 | 10/2017 | Gouko et al. | |
| 2017/0342993 A1 | 11/2017 | Yoshida et al. | |
| 2018/0038414 A1 | 2/2018 | Sasao et al. | |
| 2018/0071876 A1 | 3/2018 | Tanaka | |
| 2019/0031474 A1* | 1/2019 | Stilborn | B66C 23/00 |
| 2019/0195192 A1 | 6/2019 | Takahashi | |
| 2020/0062121 A1 | 2/2020 | Sato et al. | |
| 2020/0189631 A1* | 6/2020 | Gorman | B61L 15/0072 |

FOREIGN PATENT DOCUMENTS

| | | |
|---|---|---|
| CN | 107817760 A | 3/2018 |
| CN | 109642855 A | 4/2019 |
| CN | 109952224 A | 6/2019 |
| JP | 54-28675 A | 3/1979 |
| JP | 2003-056584 A | 2/2003 |
| JP | 2010-149244 A | 7/2010 |
| JP | 2017-026078 A | 2/2017 |
| JP | 2017-187451 A | 10/2017 |
| WO | 2016/114129 A1 | 7/2016 |
| WO | 2018/100757 A1 | 6/2018 |

\* cited by examiner

FIG.8

SAMPLING FREQUENCY
(SAMPLING CYCLE)

1kHz
(T2=1ms)

1Hz
(T1=1s)

0    50    100    150    200
TIME[s]

HEAT FLUX Q
(ABSOLUTE VALUE)

THs 0    50    100    150    200
TIME[s]

RATE OF CHANGE
D IN HEAT FLUX

THd 0    50    100    150    200
TIME[s]

FIG.14

SAMPLING FREQUENCY
(SAMPLING CYCLE)

1kHz
(T2=1ms)

1Hz
(T1=1s)

0    50    100    150    200
TIME[s]

LOAD L

THs 0    50    100    150    200
TIME[s]

RATE OF CHANGE
D IN HEAT FLUX

THd 0    50    100    150    200
TIME[s]

APPARATUS FOR COLLECTING DATA ON A MECHANCIAL APPARATUS

CROSS-REFERENCE OF RELATED APPLICATIONS

This application is the U.S. National Phase under 35 U.S.C. § 371 of International Patent Application No. PCT/JP2020/013028, filed on Mar. 24, 2020, which in turn claims the benefit of Japanese Application No. 2019-129900, filed on Jul. 12, 2019, the entire disclosures of which Applications are incorporated by reference herein.

TECHNICAL FIELD

This invention relates to a data collection apparatus that collects data on a mechanical apparatus such as a bearing apparatus.

BACKGROUND ART

A bearing for a main spindle of a machine tool is often used at a high speed and under low load, and an angular contact ball bearing is widely employed for such a bearing. The bearing for the main spindle of the machine tool is lubricated by air-oil (oil-mist) lubrication or grease lubrication. Air-oil lubrication is characterized in ability to maintain a stable lubricated state for a long period of time because of external supply of lubricating oil. Grease lubrication is characterized in excellent cost efficiency because of requirement of neither of an annexed facility and a pipe and in environmental friendliness because of an extremely small amount of generation of mist.

A bearing used in a higher-speed region such as a region where a do value calculated by multiplying an inner diameter of an inner ring by the number of rotations is equal to or larger than one million as in a main spindle of a machining center among machine tools should operate in a more stable manner. For various factors described. below, however, surface roughening or peeling at a bearing raceway surface or abnormality of a retainer occurs, and in that case, excessive increase in temperature of the bearing and resultant burning of the bearing are a concern.

Inappropriate feed and drain of lubricating oil in air-oil lubrication, (excessively small or large amount of oil or insufficient exhaust)
  Deterioration of lubricating grease sealed in bearing
  Entry of coolant or water or a foreign matter into a bearing rolling portion
  Oil film rupture due to excessive preload, that is, increase in contact pressure in rolling, portion In order to prevent burning in the bearing due to the above factors, Japanese Patent Laying-Open No. 2017-26078 (PTL 1) discloses such a technique that a lubrication oil feed pump and a contactless temperature sensor are contained in a spacer adjacent to a bearing and the lubrication oil feed pump feeds lubricating oil to the inside of the bearing in accordance with a temperature value of a bearing lubricated portion measured by the temperature sensor.

CITATION LIST

Patent Literature

PTL 1: Japanese Patent Laying-Open No. 2017-26078

SUMMARY OF INVENTION

Technical Problem

Burning of the bearing is often accompanied by more instantaneous and abrupt temperature increase than in a normal operation. Therefore, in order to prevent abnormality of the bearing including burning of the bearing (to minimize damage to the bearing), desirably, outputs from a sensor (for example, a heat flux sensor or a rotation speed sensor) that detects a state of the bearing are collected at a high frequency and stored and variation in state of the bearing is minutely monitored in short cycles. When processing for collecting outputs from the sensor at a high frequency and storing the same is constantly performed, however, an amount of collected data is huge and an annexed facility such as a recording instrument of a high capacity should be introduced. Unnecessary data is also huge, and it takes time to check or organize the data.

The present disclosure was made to solve the problems above, and an object thereof is to achieve accurate detection of abnormality or a sign of abnormality of a mechanical apparatus such as a bearing while an amount of collected data is minimized.

Solution to Problem (1) A data collection apparatus according to the present disclosure collects data on a mechanical apparatus. This data collection apparatus includes an input portion to which a result of detection by a sensor that detects a state of the mechanical apparatus is provided and a controller configured to collect the result of detection by the sensor provided to the input portion in prescribed sampling cycles for storage. The controller changes the sampling cycle in accordance with the result of detection by the sensor provided to the input portion.

(2) In one form, the mechanical apparatus includes a bearing apparatus including a bearing including an inner ring and an outer ring. The sensor includes a heat flux sensor that detects a heat flux in the bearing or in the vicinity of the bearing. The controller changes the sampling cycle in accordance with the result of detection by the heat flux sensor.

(3) In one form, when at least one of magnitude and a rate of change of the result of detection by the heat flux sensor collected in first cycles is larger than a corresponding switching threshold value, the controller changes the sampling cycle to a second cycle shorter than the first cycle and collects the result of detection by the heat flux sensor in the second cycles.

(4) In one form, when at least one of the magnitude and the rate of change of the result of detection by the heat flux sensor collected in the second cycles is larger than a corresponding judgment threshold value, the controller performs processing for preventing damage to the bearing apparatus.

(5) In one form, the processing for preventing damage to the bearing apparatus includes at least any of processing for stopping rotation of the inner ring or the outer ring, processing for reducing a rotation speed of the inner ring or the outer ring, and processing for cooling the bearing apparatus.

(6) In one form, when at least one of the magnitude and the rate of change of the result of detection by the heat flux sensor collected in the second cycles is smaller than the corresponding switching threshold value, the controller sets the sampling cycle back to the first cycle from the second cycle.

(7) In one form, the sensor includes, in addition to the heat flux sensor, at least one of a load sensor that detects preload applied to the bearing and load from the outside and a rotation speed sensor that detects a rotation speed of the inner ring or the outer ring. When a result of detection by at least one of the load sensor and the rotation speed sensor collected in first cycles exceeds a corresponding switching threshold value, the controller changes the sampling cycle to a second cycle shorter than the first cycle and collects the result of detection by the heat flux sensor in the second cycles.

(8) In one form, when at least one of magnitude and a rate of change of the result of detection by the heat flux sensor collected in the second cycles is larger than a corresponding judgment threshold value, the controller performs processing for preventing damage to the bearing apparatus.

(9) In one form, the processing for preventing damage to the bearing apparatus includes at least any of processing for stopping rotation of the inner ring or the outer ring, processing for reducing the rotation speed of the inner ring or the outer ring, and processing for cooling the bearing apparatus.

(10) In one form, the controller collects the result of detection by at least one of the load sensor and the rotation speed sensor in the second cycles. When the result of detection by at least one of the load sensor and the rotation speed sensor collected in the second cycles is smaller than the corresponding switching threshold value, the controller sets the sampling cycle back to the first cycle from the second cycle.

(11) In one form, the bearing apparatus rotatably supports a main spindle of a machine tool.

Advantageous Effects of Invention

According to this configuration, the sampling cycle in which a result of detection by the sensor is collected is changed in accordance with the result of detection by the sensor provided to the input portion. Therefore, for example, when the result of detection by the sensor indicates a normal value, the sampling cycle is set to the first cycle that is relatively short, and when the result of detection by the sensor indicates a value at which a sign of abnormality is likely to appear, the sampling cycle can be switched to the second cycle shorter than the first cycle. Consequently, abnormality or a sign of abnormality of a mechanical apparatus such as a bearing can accurately be detected while an amount of collected data is minimized.

BRIEF DESCRIPTION OF DRAWINGS

FIG. 8 is a diagram showing exemplary relation among a sampling frequency (sampling cycles), magnitude of a heat flux Q, and a rate of change D in heat flux.

FIG. 14 is a diagram showing exemplary relation among a sampling frequency (sampling cycles), load L, and rate of change D in heat flux.

DESCRIPTION OF EMBODIMENTS

Figure 1:
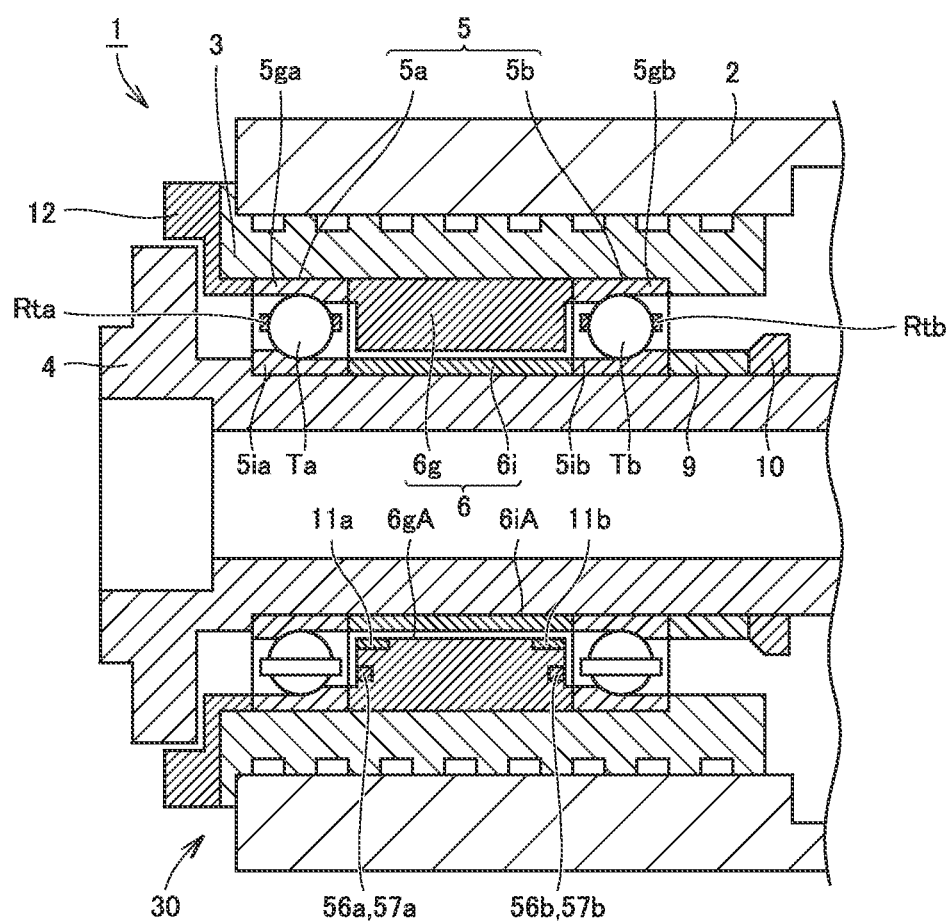
FIG. 1 is a cross-sectional view showing a schematic construction of a spindle apparatus.

An embodiment of the present disclosure will be described below with reference to the drawings. The same or corresponding elements in the drawings below have the same reference characters allotted and description thereof will not be repeated.

FIG. 1 is a cross-sectional view showing a schematic construction of a spindle apparatus 1 to be subjected to measurement by a data collection apparatus 50 (see FIG. 2) according to the present embodiment.

Spindle apparatus 1 shown in FIG. 1 is used, for example, as a built-in motor type spindle apparatus of a machine tool. In this case, a not-shown motor is incorporated on one end side of a main spindle 4 supported by spindle apparatus 1 for a main spindle of a machine tool, and a not-shown cutting tool such as an end mill is connected to the other end.

Spindle apparatus 1 includes a bearing apparatus 30. Bearing apparatus 30 includes a bearing 5 including two bearings 5a and 5b, a spacer 6 arranged adjacently to bearings 5a and 5b, and heat flux sensors 11a and 11b. Main spindle 4 is rotatably supported by a plurality of bearings 5a and 5b provided in a housing 3 embedded in an inside portion of a bearing jacket 2. Bearing 5a includes an inner ring 5ia, an outer ring 5ga, a rolling element Ta, and a retainer Rta. Bearing 5b includes an inner ring 5ib, an outer ring 5gb, a rolling element Tb. and a retainer Rtb. Spacer 6 includes an inner-ring spacer 6i and an outer-ring spacer 6g.

Inner ring 5ia of bearing 5a and inner ring 5ib of bearing 5b that are distant in an axial direction are fitted to main spindle 4 by interference fit (press-fitting). Inner-ring spacer 6i is arranged between inner rings 5ia and 5ib and outer-ring spacer 6g is arranged between outer rings 5ga and 5gb.

Bearing 5a is a rolling bearing in which a plurality of rolling elements Ta are arranged between inner ring 5ia and outer ring 5ga. Intervals between rolling elements Ta are held by retainer Rta. Bearing 5b is a rolling bearing in which a plurality of rolling elements Tb are arranged between inner ring 5ib and outer ring 5gb. Intervals between rolling elements Tb are held by retainer Rtb.

An angular contact ball bearing, a deep groove ball bearing, or a tapered roller bearing can be employed as bearings 5a and 5b. The angular contact ball bearing is included in bearing apparatus 30 shown in FIG. 1, where two bearings 5a and 5b are provided in back-to-back duplex bearing (DB) arrangement. Arrangement of the bearing is not limited to back-to-back duplex bearing arrangement, and for example, face-to-face duplex bearing arrangement may be applicable.

Though a structure in which two bearings 5a and 5b support main spindle 4 is illustrated and described, a structure in which two or more bearings support main spindle 4 may be applicable.

A cooling medium flow channel is provided in housing 3. By feeding a cooling medium between housing 3 and bearing jacket 2, bearings 5a and 5b can be cooled.

A lubricating oil supply path for injecting lubricating oil to bearings 5a and 5b for cooling and lubrication of bearings 5a and 5b may be provided, for example, in outer-ring spacer 6g. Alternatively, a nozzle for emitting cooling air toward an outside surface of inner-ring spacer 6i may be provided in outer-ring spacer 6g.

Heat flux sensors 11a and 11b that measure a heat flux are provided in bearing apparatus 30. Heat flux sensors 11a and 11b are fixed to an inside surface 6gA of outer-ring spacer 6g and are opposed to an outside surface 6iA of inner-ring spacer 6i. The heat flux refers to a quantity of heat that passes through a unit area per unit time.

Each of heat flux sensors 11a and 11b is a sensor that converts a heat flux into an electrical signal based on a Seebeck effect, and an output voltage is generated from a slight temperature difference between a front side and a rear side of the sensor. Heat flux sensors 11a and 11b are each more sensitive to variation in heat in the inside of the bearing than a temperature sensor such as a contactless temperature sensor or a thermocouple, and they timely follow variation in heat in the inside of the bearing.

Heat flux sensor 11a is arranged in inside surface 6gA of outer-ring spacer 6g, at an end on a side of bearing 5a in an axial direction (a direction along a rotation axis of main spindle 4). Heat flux sensor 11b is arranged in inside surface 6gA of outer-ring spacer 6g, at an end on a side of bearing 5b in the axial direction. Since heat flux sensors 11a and 11b are thus provided in the vicinity of respective bearings 5a and 5b in outer-ring spacer 6g, heat flux sensors 11a and 11b can directly detect a heat flux of heat that flows between the inner ring and the outer ring of bearings 5a and 5b.

Heat flux sensors 11a and 11b can also be provided in inside surface 6gA of outer-ring spacer 6g, around a central portion in the axial direction. According to such arrangement as well, a heat flux of heat that flows between the inner ring and the outer ring of bearings 5a and 5b can indirectly be detected.

In an attempt to measure a temperature of inner rings 5ia and 5ib, outer rings 5ga and 5gb, and spacer 6 for detecting a sign of abnormality such as seizure (burning) of bearings 5a and 5b, in spite of abrupt heat generation, the sign of abnormality may not be detected in an early stage because of delay in increase in temperature.

In contrast, in the present embodiment, the sign of abnormality of bearings 5a and 5b is detected based on outputs from heat flux sensors 11a and 11b. By using the outputs from heat flux sensors 11a and 11b, abrupt heat generation can quickly be detected because heat flux starts to change earlier than the temperature.

A temperature sensor 56a and a vibration sensor 57a are arranged on an end surface on the side of bearing 5a in the axial direction of outer-ring spacer 6g. A temperature sensor 56b and a vibration sensor 57h are arranged on an end surface on the side of bearing 5b in the axial direction of outer-ring spacer 6g.

Each of heat flux sensors 11a and 11b, temperature sensors 56a and 56b, and vibration sensors 57a and 57b is connected to data collection apparatus 50 (see FIG. 2) which will be described later and sends a result of detection to data collection apparatus 50.

Figure 2:
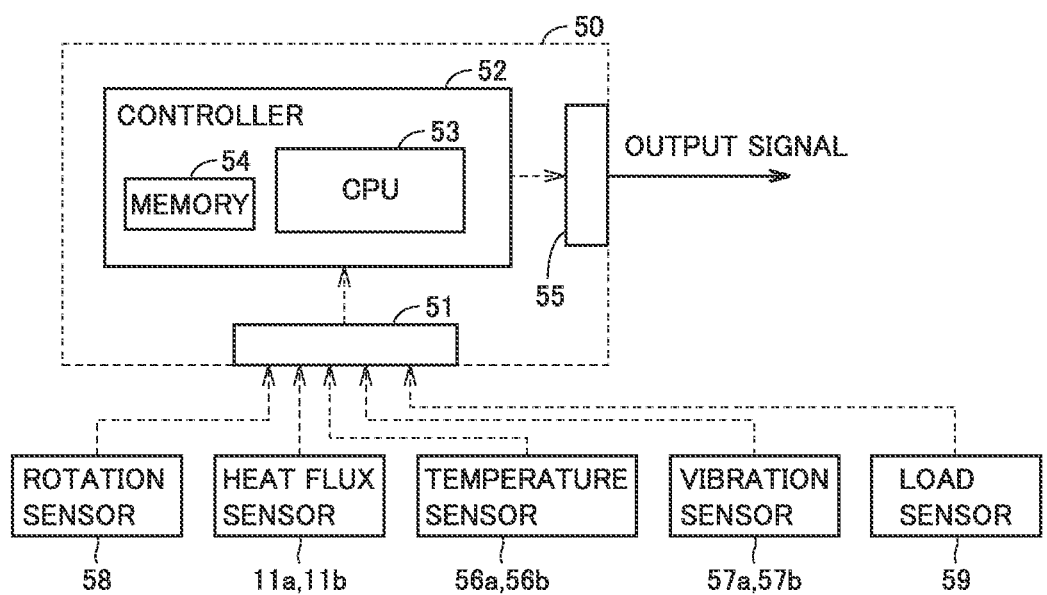
FIG. 2 is a block diagram showing an exemplary configuration of a data collection apparatus.

FIG. 2 is a block diagram showing an exemplary configuration of data collection apparatus 50 according to the present embodiment. Data collection apparatus 50 collects data that represents a result of detection by each sensor provided in bearing apparatus 30. Though an example in which data collection apparatus 50 is applied to bearing apparatus 30 is shown in the present embodiment, the data collection apparatus according to the present disclosure is applicable also to a mechanical apparatus other than the bearing apparatus.

Data collection apparatus 50 includes an input portion 51, a controller 52, and an output portion 55. Input portion 51 is connected to heat flux sensors 11a and 11b, temperature sensors 56a and 56h, vibration sensors 57a and 57b, a rotation sensor 58, and a load sensor 59. A result of detection by each sensor is provided to input portion 51.

Rotation sensor 58 detects a rotation speed N of main spindle 4. Rotation sensor 58 may be provided in the inside or on the outside of bearing apparatus 30.

Load sensor 59 is provided, for example, in a gap between the bearing and the spacer so as to detect preload applied to bearing 5 and external load. For example, in a machine instrument tool, preload applied to bearing 5 also varies due to variation in force externally applied by a workpiece or heat generation due to high-speed operation or centrifugal force. With increase in preload, a quantity of heat generation may increase due to friction force caused by oil film rupture. Therefore, it is also effective to determine that there is a sign of abnormality of bearings 5a and 5b when load sensor 59 detects increase in preload.

Controller 52 includes a central processing unit (CPU) 53 and a memory (storage) 54, and carries out various types of control such as control for collecting and storing data on bearings 5a and 5b, control for detecting a sign of abnormality of bearings 5a and 5b, and control for cooling bearings 5a and 5b. Various types of control are not limited to processing by software, and processing by dedicated hardware (electronic circuitry) is also applicable.

Controller 52 is configured to collect outputs (results of detection) from each sensor provided to input portion 51 in prescribed sampling cycles and to have them stored in memory 54. Controller 52 determines whether or not there is a sign of abnormality such as seizure of bearings 5a and 5b based on the result of detection by each sensor stored in memory 54. When it is determined that there is a sign of abnormality, controller 52 performs processing for preventing damage (which is also simply referred to as "damage prevention processing" below) due to seizure or the like of bearings 5a and 5b. Damage prevention processing includes at least any of processing for stopping rotation of main spindle 4, processing for reducing the rotation speed of main spindle 4, and processing for cooling beating apparatus 30. Damage prevention processing may include processing for giving a notification of abnormality by turning on a warning indicator or the like.

<Acceleration and Slowdown Test>

The present applicant conducted an acceleration and slowdown test, in which the hearing apparatus according to the embodiment was incorporated in a tester simulating a main spindle of a machine tool and relation among a heat flux, a temperature, and a rotation speed at the time when the rotation speed of main spindle 4 was increased and decreased was evaluated.

Figure 3:
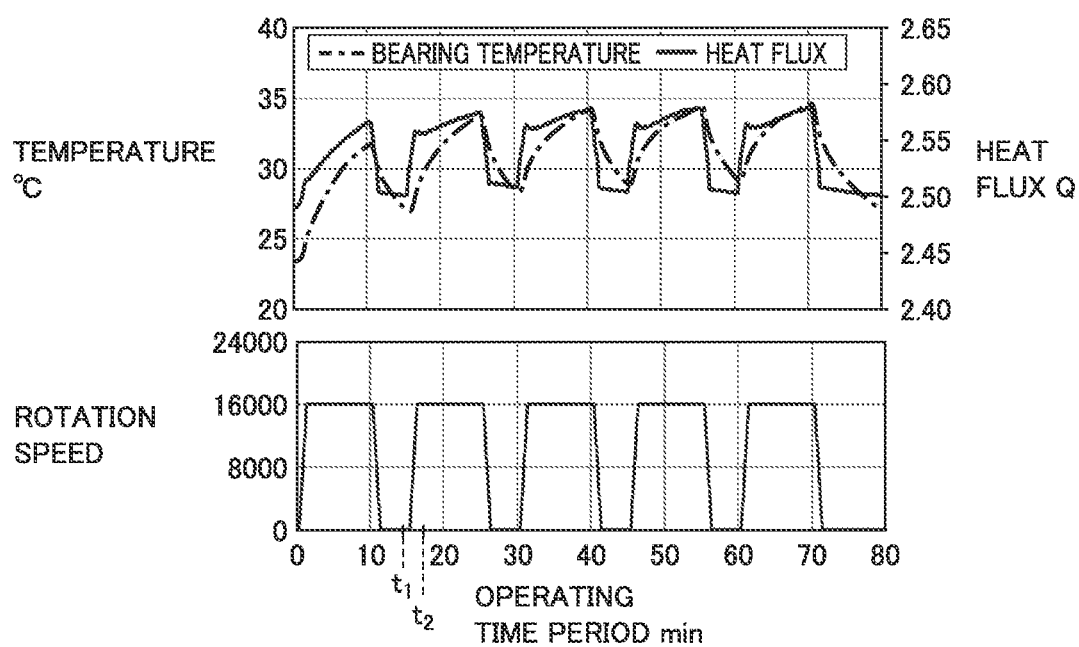
FIG. 3 is a diagram showing relation among a heat flux, a temperature, and a rotation speed obtained in an acceleration and slowdown test.
Figure 4:
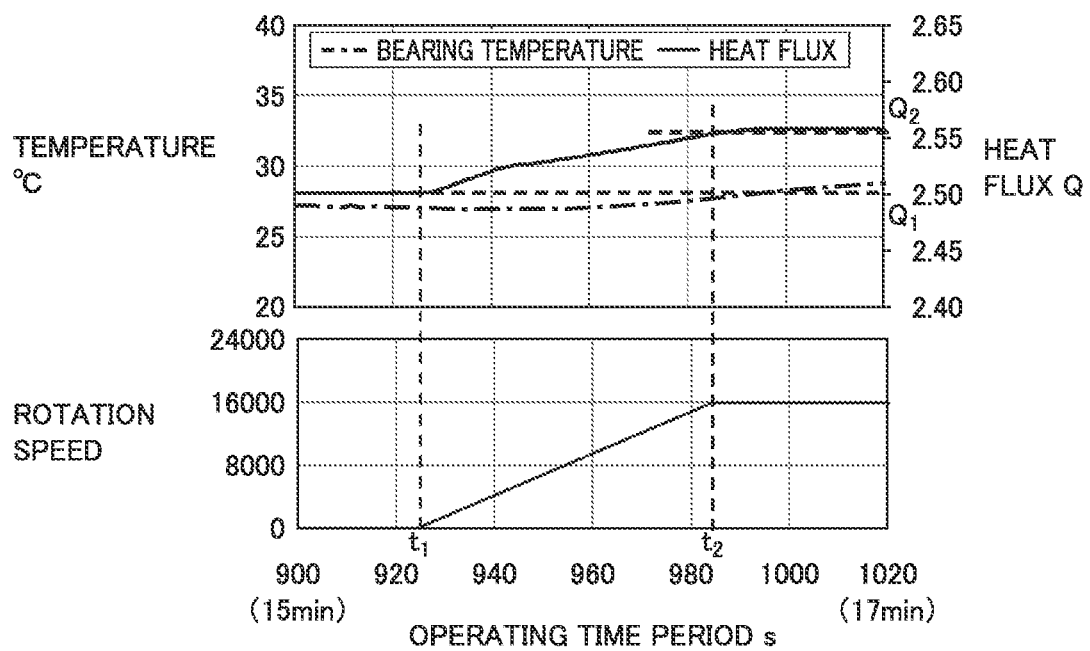
FIG. 4 is an enlarged view of the abscissa in a section from t1 to t2 in FIG. 3.

FIG. 3 is a diagram showing relation among a heat flux, a temperature, and a rotation speed obtained in the acceleration and slowdown test. FIG. 4 is an enlarged view of the abscissa in a section from t1 to t2 in FIG. 3. Numerical values shown in FIGS. 3 and 4 and other figures are merely by way of example and limitation to these numerical values is not intended. This is also applicable to numerical values shown in figures which will be described below.

As shown in FIG. 3, an output (heat flux) from the heat flux sensor is higher in responsiveness to increase and decrease in rotation speed than an output (temperature of the bearing) from the temperature sensor, and accuracy in detection of a sign of abnormality of the bearing may be improved. Timing of start of increase and decrease in output from the heat flux sensor is substantially synchronous with timing of start of increase and decrease in rotation speed.

<Bearing Abnormality Occurrence Simulation Test>

The present applicant conducted a bearing abnormality occurrence simulation test in an attempt to detect a sign on the occurrence of abnormality in a rolling bearing. In the present simulation test, by introducing a very small amount of lubricating oil into the rolling bearing only at the time of assembly of the main spindle, a situation where abnormality due to run-out of lubricating oil was likely to occur in a tested bearing was created. Such setting that a limiter was activated and the tester automatically stopped when a driving motor was overloaded due to abnormality in the tested bearing was made.

Figure 5:
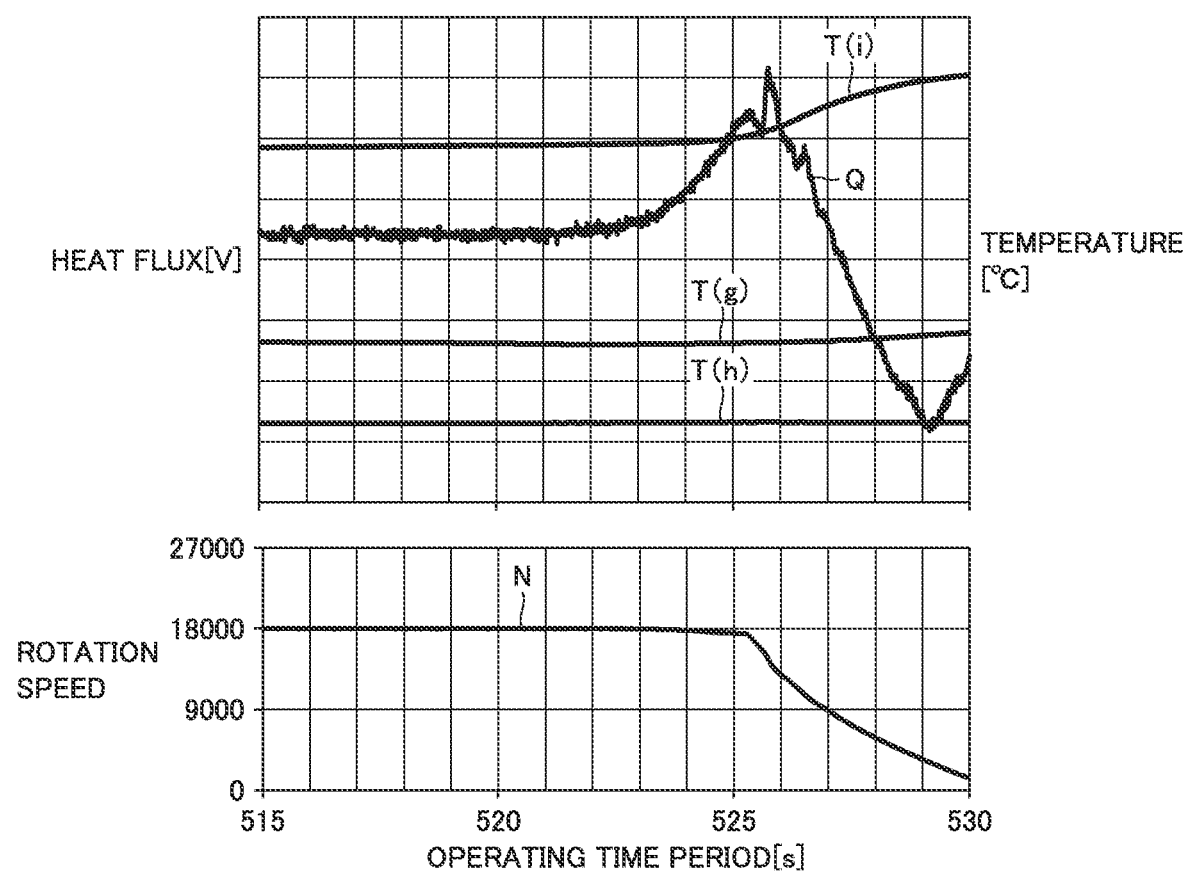
FIG. 5 is a diagram showing exemplary relation among a heat flux, a temperature, and a rotation speed in a bearing abnormality simulation test.

FIG. 5 is a diagram showing exemplary relation among a heat flux, a temperature, and a rotation speed in the test in which bearing abnormality due to run-out of lubricating oil was simulated. The abscissa represents an operating time period (seconds). The upper field shows a heat flux Q, an inner ring temperature T(i), an outer ring temperature T(g), and a housing temperature T(h), and the lower field shows a rotation speed N (the number of rotations per minute).

Based on relation between a heat capacity and heat radiation, relation of inner ring temperature T(i)>outer ring temperature T(g)>housing temperature T(h) is held.

Rotation speed N starts to lower after time 525 (seconds) at which overloading of the driving motor was detected. Before time 525 (seconds), each temperature hardly changed, and it can be seen that it is difficult to detect a sign of abnormality based on the temperature. It is expected based on a result of the test that increase in output value of heat flux Q is observed earlier than increase in inner ring temperature T(i) and the like and that heat flux Q is effective in early detection of the sign of occurrence of abnormality in the rolling bearing.

Figure 6:
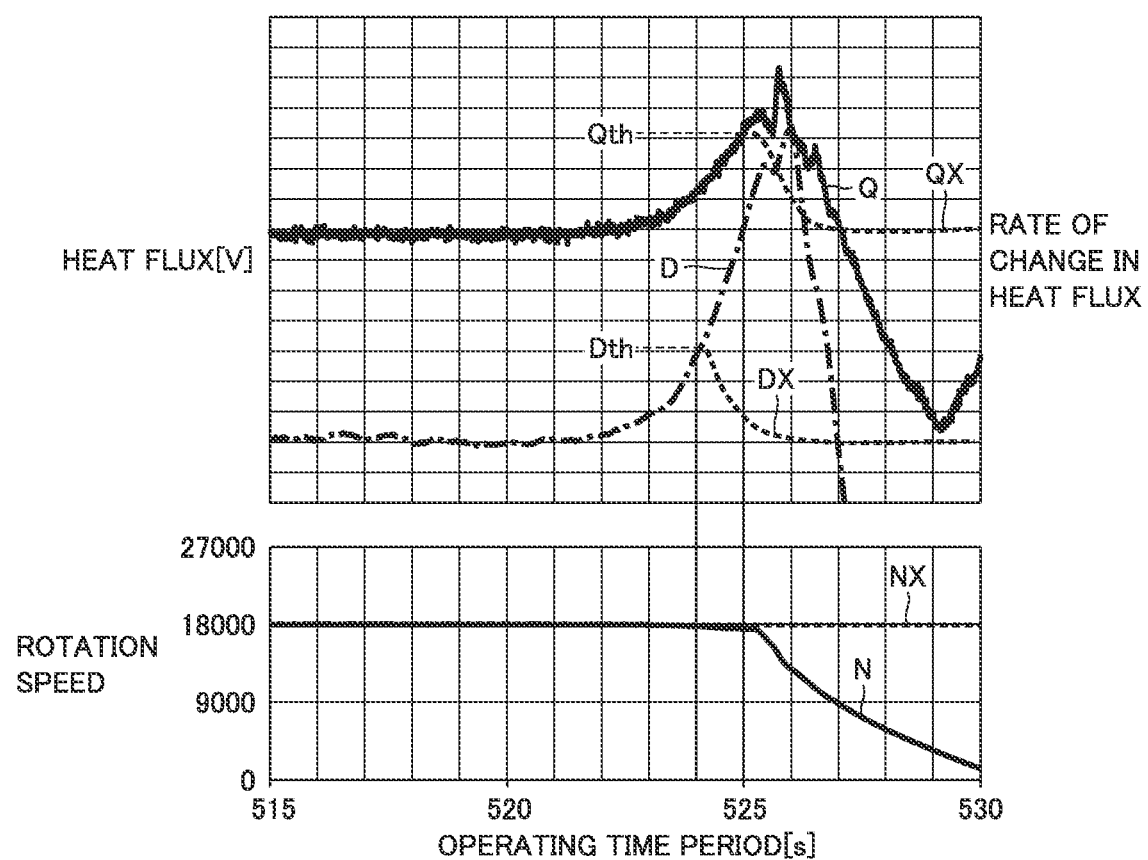
FIG. 6 is a waveform diagram for illustrating an operation by the hearing apparatus.

FIG. 6 is a waveform diagram for illustrating an operation by bearing apparatus 30 according to the present embodiment. FIG. 6 shows a waveform at the time when the damage prevention processing described above is performed, as being superimposed on the waveform in a simulation experiment shown in FIG. 5. FIG. 6 shows an example in which processing for cooling bearing apparatus 30 is performed as damage prevention processing.

The abscissa in FIG. 6 represents an operating time period (seconds). The upper field shows heat flux Q and a rate of change D in heat flux, and a heat flux QX and a rate of change DX at the time when damage prevention processing (cooling of bearing apparatus 30) is performed are shown as being superimposed thereon. The lower field shows rotation speed N (the number of rotations per minute).

When damage prevention processing is not performed, after time 525 (seconds), overload of the motor due to damage to the bearing is detected and rotation speed N starts to lower.

In order to avoid damage to the bearing, desirably, a sign of abnormality is detected and damage prevention processing is performed before time 525 (seconds). Since the temperature increases after time 525 (seconds) as shown in FIG. 5, damage prevention processing performed based on increase in temperature is too late. In contrast, heat flux Q detected by the heat flux sensor increases from about time 523 (seconds). Therefore, damage prevention processing is preferably started in response to detection of increase in output from the heat flux sensor. A threshold value Qth on which determination as increase in output from the heat flux sensor is based should be set with a margin in consideration of noise in a steady state. With individual variation of a machine in which the bearing is set or operating conditions set by a user being various, however, it is very difficult to set threshold value Qth for slight increase.

In contrast, it was found in experiments conducted by the inventors that a sign of damage to the bearing could be found early by calculating rate of change D (a rate of change per unit time) in heat flux Q. It was also found about rate of change D that a relatively uniformly determined threshold value could practically be used even though individual variation in machine in which the bearing is set or the operating condition set by the user was different. Therefore, more preferably, damage prevention processing is started when rate of change D in heat flux Q (output from the heat flux sensor) exceeds a threshold value Dth.

Rate of change D is a parameter calculated by time derivative of heat flux Q detected by the heat flux sensor. By using the parameter obtained by time derivative of heat flux Q, instantaneous and abrupt heat generation can accurately be detected.

By starting damage prevention processing based on detection of the sign of abnormality at the time point (around 525 seconds) when heat flux Q exceeds threshold value Qth or at the time point (around 524 seconds) when rate of change D in heat flux exceeds threshold value Dth, the bearing is not damaged. Consequently, in the waveform in FIG. 6, a steady operation can continue as shown with a rotation speed NX also after time 525 (seconds), without restriction being imposed on the motor.

In view of results above, when magnitude of heat flux Q or rate of change D in heat flux Q detected by heat flux sensors 11a and 11b exceeds a judgment threshold value (threshold value Qth or threshold value Dth), controller 52 according to the present embodiment determines that there is a sign of abnormality (seizure or the like) of bearings 5a and 5b and performs damage prevention processing. Damage to bearings 5a and 5b is thus prevented and lifetime thereof is extended.

<Switching of Cycle of Sampling of Sensor Outputs>

As described above, burning of the bearing is accompanied by more instantaneous and abrupt temperature increase than in a normal operation. Therefore, in order to prevent burning of bearings 5a and 5b (to minimize damage to bearings 5a and 5b), desirably, outputs from heat flux sensors 11a and 11b are collected at a high frequency and stored and variation in state of bearings 5a and 5b is minutely monitored in short cycles. When processing for collecting outputs from heat flux sensors 11a and 11b sensor at a high frequency and storing the same is constantly performed, however, an amount of collected data is huge and an annexed facility such as a recording instrument of a high capacity should be introduced. Unnecessary data is also huge, and it takes time to check or organize the data.

Controller 52 according to the present embodiment accurately detects a sign of abnormality (burning or the like) of bearings 5a and 5b while an amount of collected data is minimized, by changing a sampling cycle in which outputs (heat flux Q) from heat flux sensors 11a and 11b are collected, in accordance with a result of detection by heat flux sensors 11a and 11b.

Figure 7:
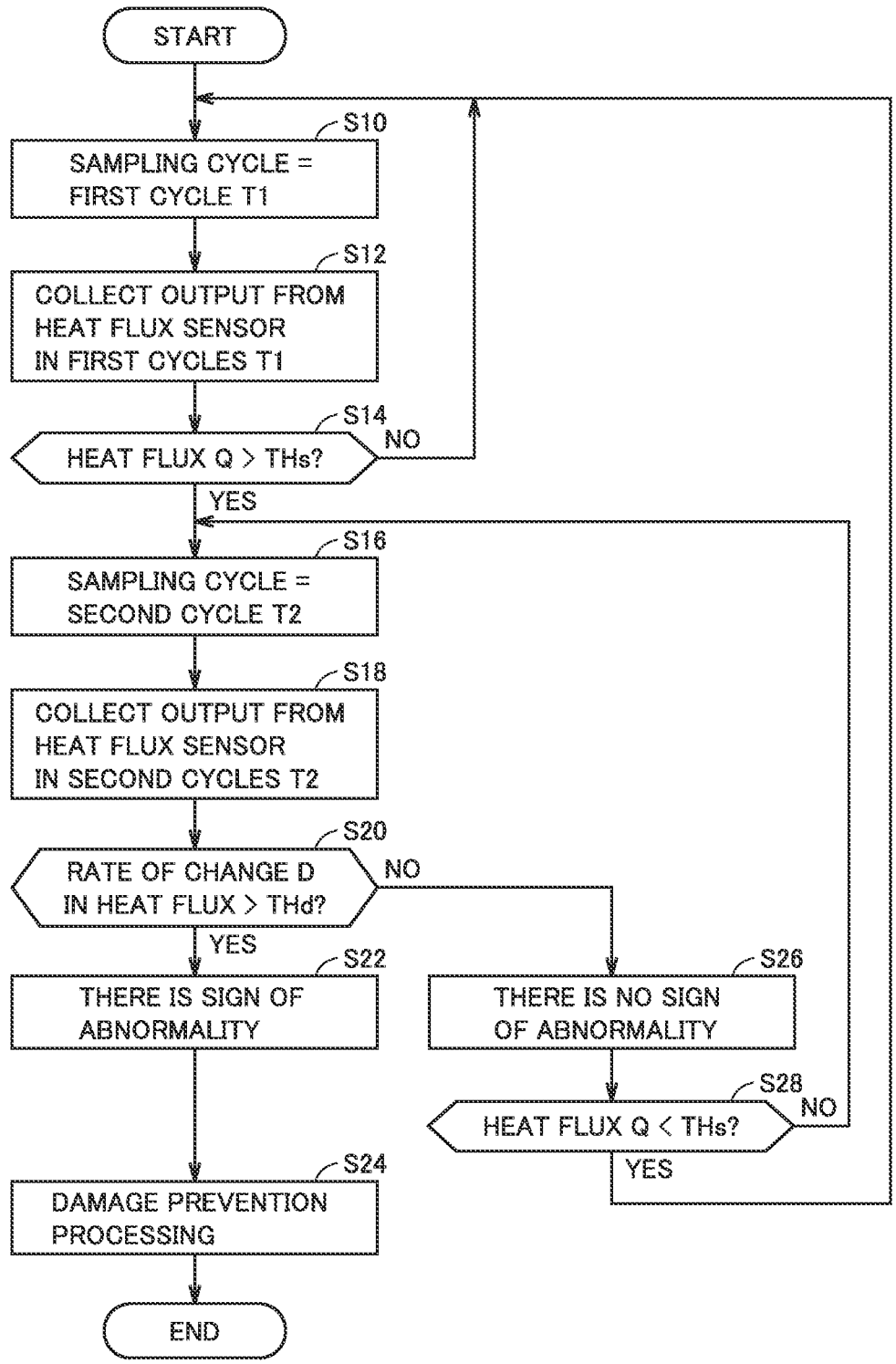
FIG. 7 is a flowchart (No. 1) showing an exemplary procedure of processing in a controller.

FIG. 7 is a flowchart showing an exemplary processing procedure in control by controller 52. FIG. 7 shows an example in which whether or not to switch the sampling cycle is determined with magnitude (an absolute value) of heat flux Q being defined as a parameter and whether or not there is a sign of abnormality is determined with rate of change D in heat flux Q being defined as a parameter. Since two heat flux sensors 11a and 11b are provided in the present embodiment, for example, a larger one of an output from heat flux sensor 11a and an output from heat flux sensor 11b can be adopted as heat flux Q to be used for determination.

Initially, controller 52 sets the sampling cycle to a first cycle T1 (for example, one second) (step S10). This first cycle T1 is a sampling cycle for a normal operation in which there is no abnormality or a sign of abnormality of bearings 5a and 5b.

Then, controller 52 collects outputs (heat flux Q) from heat flux sensors 11a and 11b in first cycles T1 set in step S10 (step S12). Heat flux Q collected in first cycles T1 is stored in memory 54.

Then, controller 52 determines whether or not magnitude (absolute value) of heat flux Q collected in step S12 is larger than a switching threshold value THs (step S14). This determination is processing for determining whether or not to switch the sampling cycle to a second cycle T2 (for example, one millisecond) shorter than first cycle T1 in order to accurately detect a sign of abnormality of bearings 5a and 5b. In other words, this determination is processing for determining whether or not magnitude (absolute value) of heat flux Q has a value in a normal operation or a value at which a sign of abnormality is likely to appear. Therefore, switching threshold value THs can be set to a value at which a sign of abnormality of bearings 5a and 5b is likely to appear, such as a value slightly smaller than a threshold value Qth shown in FIG. 6.

When magnitude of heat flux Q is smaller than switching threshold value THs (NO in step S14), controller 52 has the process return to step S10 and maintains the sampling cycle at first cycle T1.

When magnitude of heat flux Q is larger than switching threshold value Ths (YES in step S14), controller 52 sets the sampling cycle to second cycle T2 (for example, one millisecond) shorter than first cycle T1 (step S16). When the current sampling cycle has been set to first cycle T1, the sampling cycle is thus switched from first cycle T1 to second cycle T2 shorter than first cycle T1.

Then, controller 52 collects outputs (heat flux Q) from heat flux sensors 11a and 11b in second cycles T2 set in step S16 and has the outputs stored in memory 54 (step S18).

Then, controller 52 collects outputs (heat flux Q) from heat flux sensors 11a and 11b in second cycles T2 (step S18). Heat flux Q collected in second cycles T2 is stored in memory 54.

Then, controller 52 determines whether or not rate of change D in heat flux Q collected in second cycles T2 has exceeded a judgment threshold value THd (step S20). This determination is processing for determining whether or not there is a sign of abnormality of bearings 5a and 5b (detecting a sign of abnormality). Rate of change D in heat flux Q can be obtained, for example, by dividing a difference between previous heat flux Q stored in memory 54 and present heat flux Q by a time difference.

In determining whether or not there is a sign of abnormality with rate of change D in heat flux Q being defined as the parameter as in the present embodiment, judgment threshold value THd can be set, for example, to threshold value Dth shown in FIG. 6.

Alternatively, judgment criterion value Dth may be determined in accordance with an expression (1) below, for example, based on variation in heat flux from Q1 to Q2 during a period between time t1 and time t2 in FIG. 4.

$$THd = M \times (Q2-Q1)/(t2-t1) \qquad (1)$$

where "M" represents a safety factor. Since safety factor M in the expression is different for each main spindle of the machine tool, M is set to various values such as M=1 and M=100.

Since it has been known that a value of rate of change D in heat flux Q at the time of occurrence of abnormality of the bearing is significantly larger than a value thereof at the time of increase in rotation speed N, uniform threshold value Dth can be used for rate of change D, regardless of variation in rotation speed N.

When rate of change D in heat flux Q has exceeded judgment threshold value THd (YES in step S20), controller 52 determines that there is a sign of abnormality (step S22) and performs damage prevention processing (step S24). As described above, damage prevention processing includes, for example, at least any of processing for stopping rotation of main spindle 4, processing for reducing the rotation speed of main spindle 4, and processing for cooling bearing apparatus 30.

When rate of change D in heat flux Q has not exceeded judgment threshold value THd (NO in step S20), controller 52 determines that there is no sign of abnormality (step S26).

Thereafter, controller 52 determines whether or not magnitude of heat flux Q collected in second cycles T2 is smaller than switching threshold value THs (step S28). This determination is processing for determining whether or not to set the sampling cycle back to first cycle T1 (for example, one second) from second cycle T2 (for example, one millisecond). When magnitude of heat flux Q is larger than switching threshold value THs (NO in step S28), controller 52 has the process return to step S16 and repeats processing in step S16 or later with the sampling cycle being maintained at second cycle T1. When magnitude of heat flux Q is smaller than switching threshold value THs (YES in step S28), controller 52 has the process return to step S10 and repeats processing in step S10 or later with the sampling cycle being set back to first cycle T1 from second cycle T1.

FIG. 8 is a diagram showing exemplary relation among a sampling frequency (sampling cycles), magnitude (absolute value) of heat flux Q, and rate of change D in heat flux in the present embodiment. The abscissa represents an operating time period (seconds). The upper field shows the sampling frequency (sampling cycles), the field in the middle shows heat flux Q (absolute value), and the lower field shows rate of change D in heat flux. FIG. 8 shows an example in which first cycle T1 is set to one second (1 s) and second cycle T2 is set to one millisecond (1 ms). The sampling frequency corresponding to first cycle T1 (1 s) is 1 Hz and the sampling frequency corresponding to second cycle T2 (1 ins) is 1 kHz.

Before time 100 (seconds), heat flux Q (absolute value) is smaller than switching threshold value THs. In this case, it is assumed that a sign of abnormality of bearings 5a and 5b is unlikely to appear. Therefore, the sampling cycle is set to one second (first cycle T1) on a low rate side. An amount of collected data is thus made smaller than in an example in which the sampling cycle is constantly set to one millisecond (second cycle t2) on a high rate side. Therefore, data can be stored in a general-purpose recording instrument without newly introducing an annexed facility such as a recording instrument of a high capacity.

At time 100 (seconds) when magnitude (absolute value) of heat flux Q reaches switching threshold value THs, the sampling cycle is switched from one second (first cycle T1) to one millisecond (second cycle T2) Therefore, at time 100 (seconds) or later, heat flux Q is collected and stored every one millisecond. Since variation in state of bearings 5a and 5b can thus minutely be monitored in short cycles, a sign of abnormality (burning or the like) of bearings 5a and 5b can accurately be detected.

Then, rate of change D in heat flux Q collected every one millisecond is calculated, and when rate of change D exceeds judgment threshold value THd, it is determined that there is a sign of abnormality and damage prevention processing is performed. Occurrence of abnormality (burning or the like) of bearings 5a and 5b can thus be prevented.

As set forth above, when magnitude of heat flux Q is smaller than switching threshold value THs (a value in the normal operation), controller 52 according to the present embodiment sets the sampling cycle to relatively short first cycle T1. When magnitude of heat flux Q is larger than switching threshold value THs (a sign of abnormality is likely to appear), controller 52 switches the sampling cycle to second cycle T2 shorter than first cycle T1 and determines whether or not there is a sign of abnormality of beatings 5a and 5b based on rate of change 1) in heat flux Q collected in second cycles T2. A sign of abnormality of bearings 5a and 5b can thus accurately be detected while an amount of collected data is minimized.

First Modification

The embodiment described above shows an example in which whether or not there is a sign of abnormality is determined with rate of change D in heat flux Q being defined as the parameter. Whether or not there is a sign of abnormality, however, may be determined with magnitude of heat flux Q being defined as the parameter.

Figure 9:
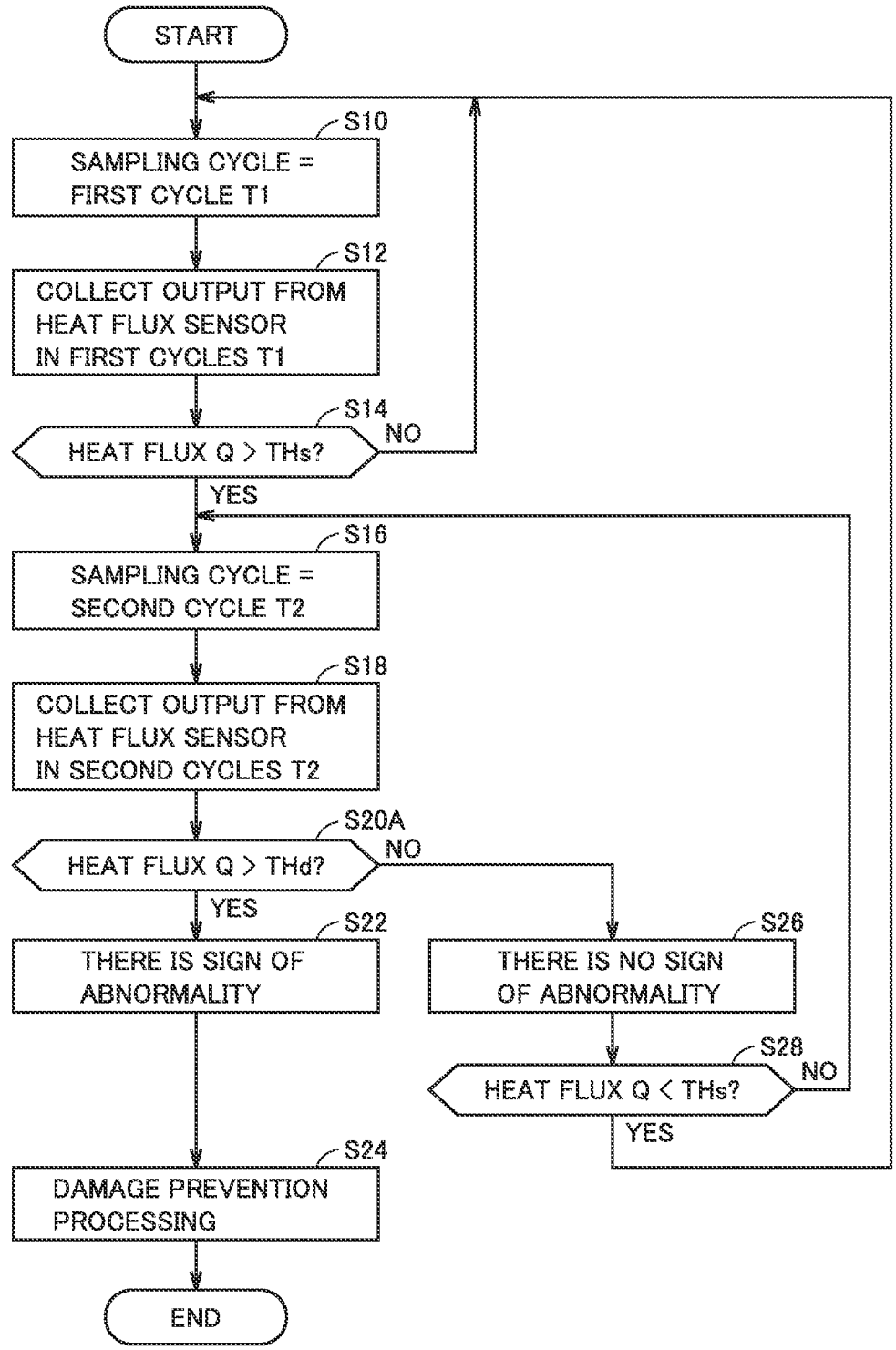
FIG. 9 is a flowchart (No. 2) showing an exemplary procedure of processing in the controller.

FIG. 9 is a flowchart showing an exemplary processing procedure in control by controller 52 according to the present first modification. The flowchart in FIG. 9 is different from the flowchart in FIG. 7 described above in that step S20 is changed to step S20A. Since other steps (steps identical in reference characters to the steps shown in FIG. 7 described above) have already been described, detailed description will not be repeated.

When magnitude of heat flux Q is larger than switching threshold value THs (YES in step S14), controller 52 sets the sampling cycle to second cycle T2 shorter than first cycle T1 (step S16) and collects outputs (heat flux Q) from heat flux sensors 11a and 11b in second cycles T2 (step S18).

Then, controller 52 determines whether or not magnitude of heat flux Q collected in second cycles T2 has exceeded judgment threshold value THd (step S20A). This determination is processing for determining whether or not there is a sign of abnormality of bearings 5a and 5b (detecting a sign of abnormality). Therefore, in this processing, judgment threshold value THd can be set, for example, to threshold value Qth shown in FIG. 8. In view of the fact that this determination is made based on heat flux Q collected in second cycles T2, judgment threshold value THd is set to a value larger by a prescribed value than switching threshold value THs used for switching between the sampling cycles.

When magnitude of heat flux Q has not exceeded judgment threshold value THd (NO in step S20A), controller 52 determines that there is no sign of abnormality (step S26). When magnitude of heat flux Q has exceeded judgment threshold value THd (YES in step S20A), controller 52 determines that there is a sign of abnormality (step S22) and performs damage prevention processing (step S24).

Figure 10:
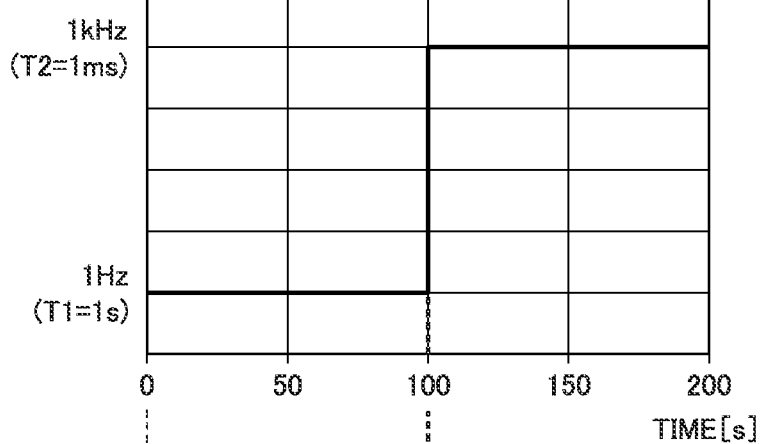
FIG. 10 is a diagram showing exemplary relation between a sampling frequency (sampling cycles) and heat flux Q.
Figure 10:
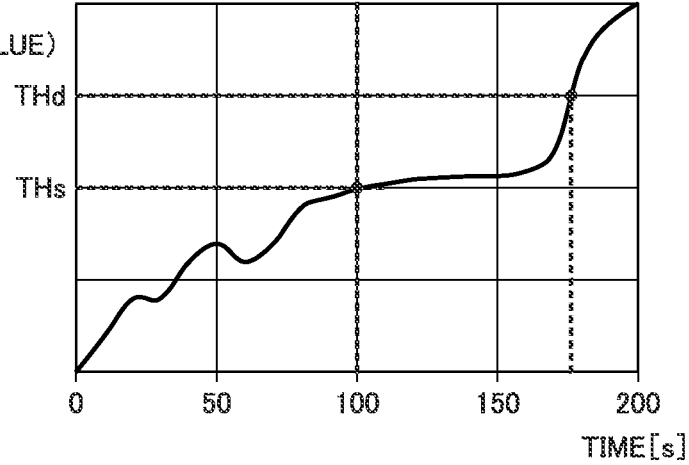

FIG. 10 is a diagram showing exemplary relation between a sampling frequency (sampling cycles) and heat flux Q (absolute value) in the present first modification. The abscissa represents an operating time period (seconds). The upper field shows the sampling frequency (sampling cycles) and the lower field shows heat flux Q (absolute value).

Before time 100 (seconds), heat flux Q (absolute value) is smaller than switching threshold value THs. Therefore, the sampling cycle is set to one second (first cycle T1).

At time 100 (seconds) when heat flux Q (absolute value) reaches switching threshold value THs, the sampling cycle is switched from one second (first cycle T1) to one millisecond (second cycle T2). Therefore, at time 100 (seconds) or later, heat flux Q is collected every one millisecond.

Then, when magnitude of heat flux Q collected every one millisecond exceeds judgment threshold value THd, it is determined that there is a sign of abnormality and damage prevention processing is performed.

According to such a modification as well, as in the embodiment described above, a sign of abnormality of bearings 5a and 5b can accurately be detected while an amount of collected data is minimized.

Second Modification

The embodiment described above shows an example in which the sampling cycle is switched with magnitude of heat flux Q being defined as the parameter. The sampling cycle may be switched, however, with rotation speed N being defined as the parameter.

Figure 11:
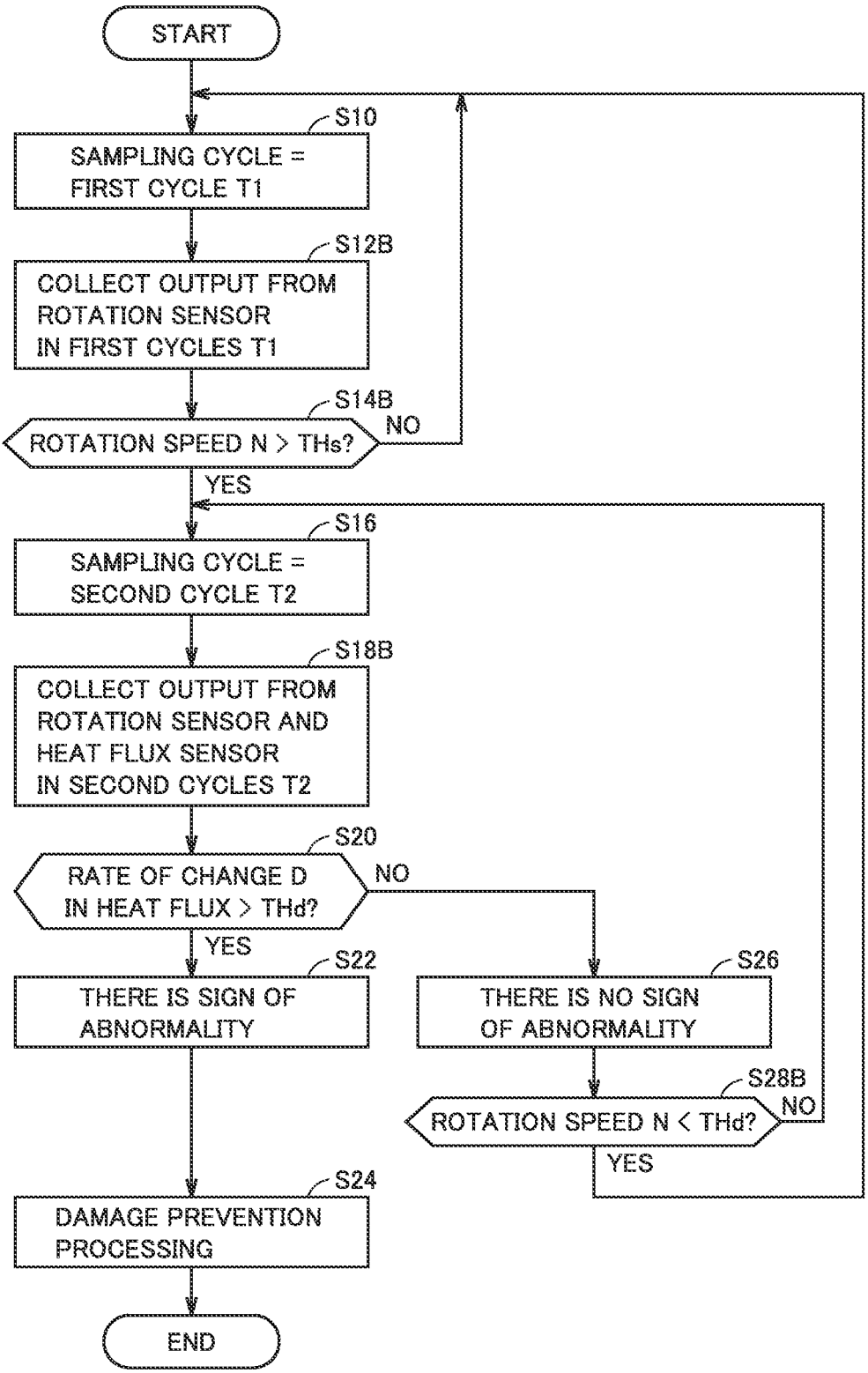
FIG. 11 is a flowchart showing an exemplary procedure of processing in the controller.

FIG. 11 is a flowchart showing an exemplary processing procedure in control by controller 52 according to the present second modification. The flowchart in FIG. 11 is different from the flowchart in FIG. 7 described above in that steps S12, S14, S18, and S28 are changed to steps S12B, S14B, S18B, and S28B. Since other steps (steps identical in reference characters to the steps shown in FIG. 7 described above) have already been described, detailed description will not be repeated.

Controller 52 collects outputs (rotation speed N) from rotation sensor 58 in first cycles T1 and has the outputs stored (step S12B).

Then, controller 52 determines whether or not rotation speed N collected in first cycles T1 is larger than switching threshold value THs (step S14B). Switching threshold value THs can be set to a rotation speed at which a sign of abnormality of bearings 5a and 5b is likely to appear. When rotation speed N is not larger than switching threshold value THs (NO in step S14B), controller 52 has the process return to step S10.

When rotation speed N is larger than switching threshold value THs (YES in step S14B), controller 52 sets the sampling cycle to second cycle T2 shorter than first cycle T1 (step S16).

Then, controller 52 collects outputs (rotation speed N) from rotation sensor 58 and outputs (heat flux Q) from heat flux sensors 11a and 11b in second cycles T2 (step S18B). Collected rotation speed N and heat flux Q are stored in memory 54.

Then, controller 52 determines whether or not rate of change D in heat flux Q collected in second cycles T2 has exceeded judgment threshold value THd (step S20).

When rate of change D has not exceeded judgment threshold value THd (NO in step S20), controller 52 determines that there is no sign of abnormality (step S26) and determines whether or not rotation speed N collected in second cycles T2 is smaller than switching threshold value THs (step S28B).

When rotation speed N is not smaller than switching threshold value THs (NO in step S28B), controller 52 has the process return to step S16 and repeats processing in step S16 or later with the sampling cycle being maintained at second cycle T1. When rotation speed N is lower than switching threshold value THs (YES in step S28B), controller 52 has the process return to step S10 and repeats processing in step S10 or later with the sampling cycle being set back to first cycle T1 from second cycle T1.

Figure 12:
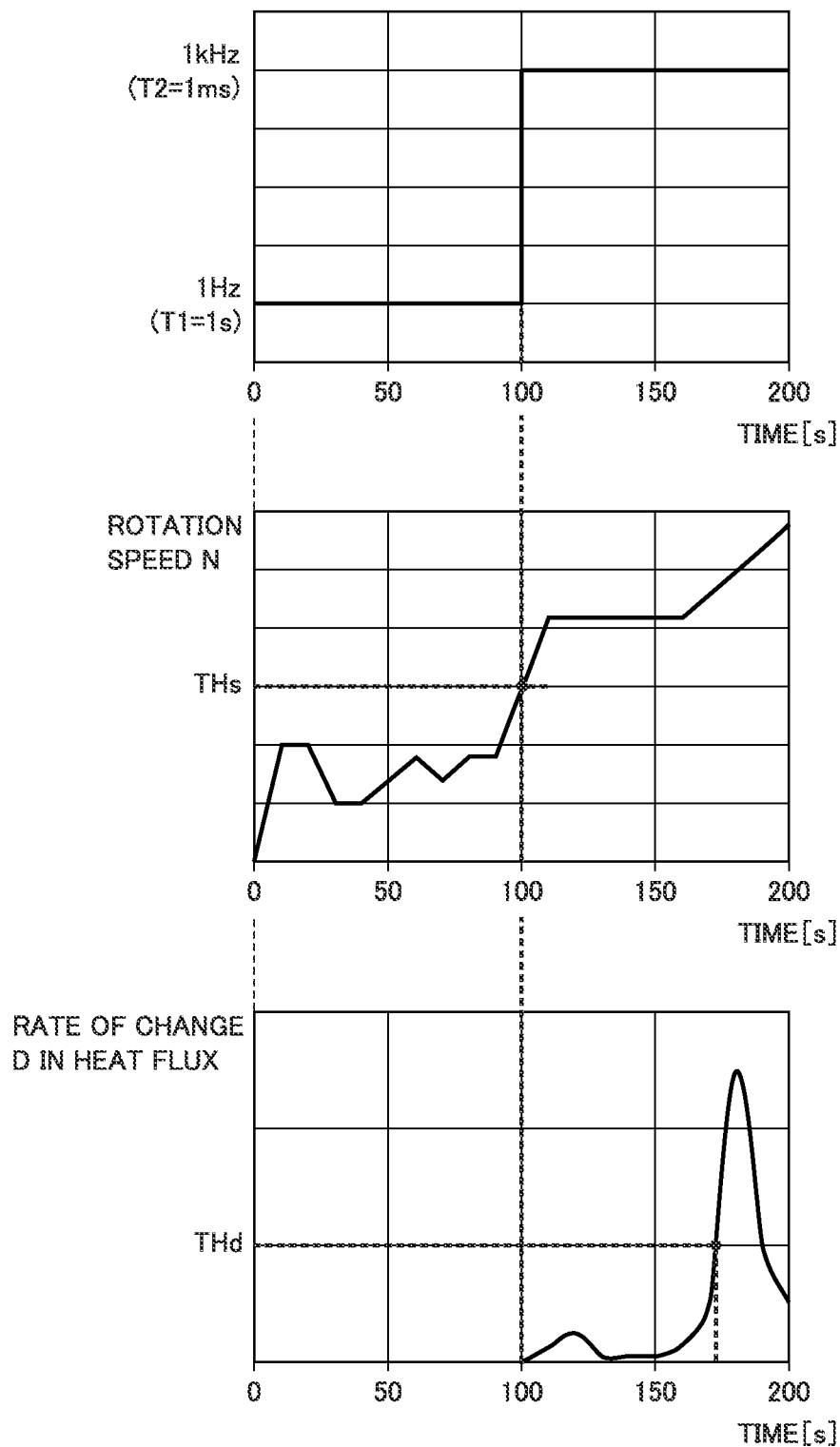
FIG. 12 is a diagram showing exemplary relation among a sampling frequency (sampling cycles), a rotation speed N, and rate of change D in heat flux.

FIG. 12 is a diagram showing exemplary relation among a sampling frequency (sampling cycles), rotation speed N, and rate of change D in heat flux in the present embodiment. The abscissa represents an operating time period (seconds). The upper field shows the sampling frequency (sampling cycles), the field in the middle shows rotation speed N, and the lower filed shows rate of change D in heat flux.

Before time 100 (seconds), rotation speed N is lower than switching threshold value THs. Therefore, the sampling cycle is set to one second (first cycle T1).

At time 100 (seconds) when rotation speed N reaches switching threshold value THs, the sampling cycle is switched from one second (first cycle T1) to one millisecond (second cycle T2). At time 100 (seconds) or later, rotation speed N and heat flux Q are collected every one millisecond.

Then, when rate of change D in heat flux Q collected every one millisecond exceeds judgment threshold value THd, it is determined that there is a sign of abnormality and damage prevention processing is performed.

According to such a modification as well, as in the embodiment described above, a sign of abnormality of bearings 5a and 5b can accurately be detected while an amount of collected data is minimized.

Third Modification

The embodiment described above shows an example in which the sampling cycle is switched with magnitude of heat flux Q being defined as the parameter. The sampling cycle may be switched, however, with a result of detection by load sensor 59 (which is also referred to as "load L" below) being defined as the parameter.

Figure 13:
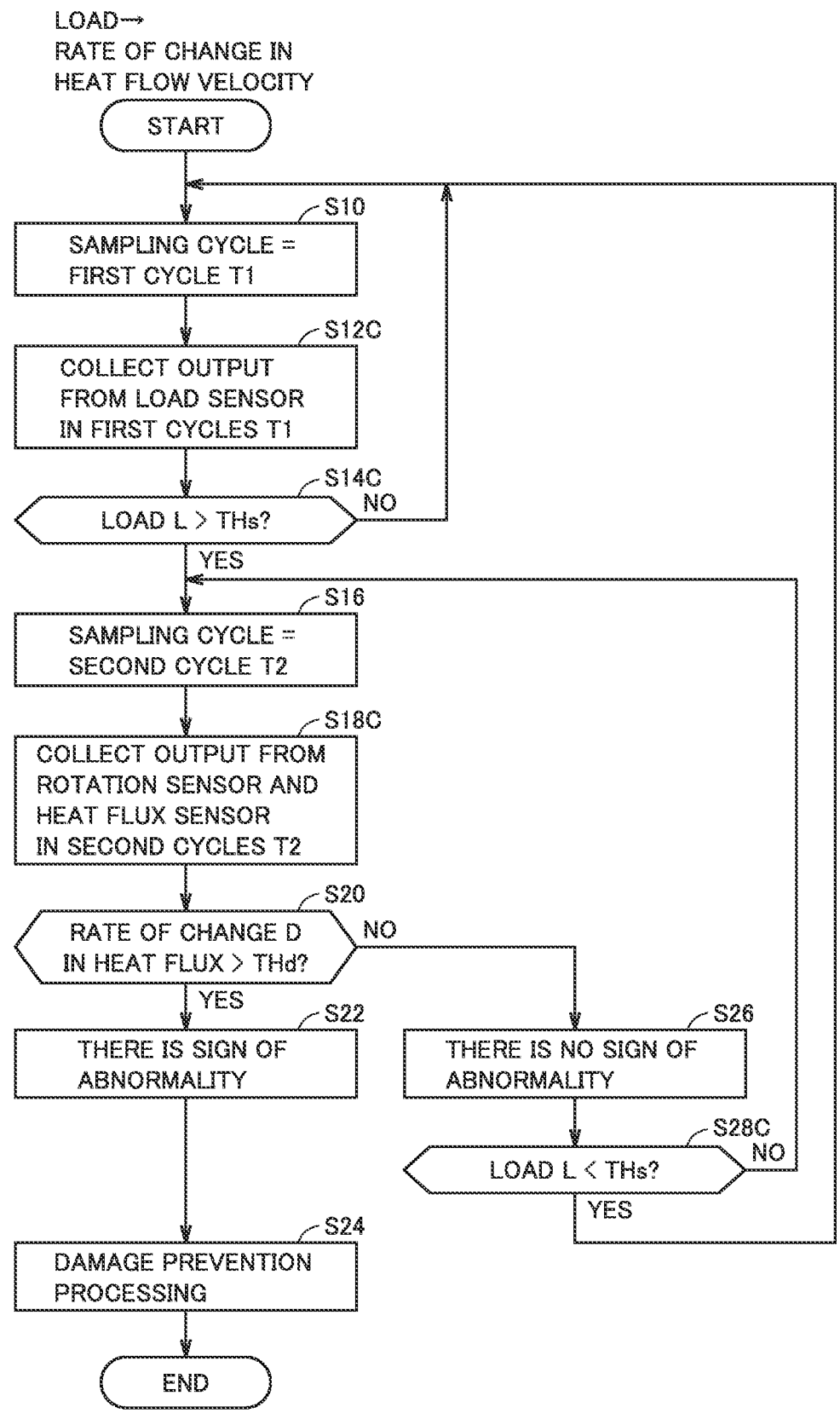
FIG. 13 is a flowchart showing an exemplary procedure of processing in the controller.

FIG. 13 is a flowchart showing an exemplary processing procedure in control by controller 52 according to the present third modification. The flowchart in FIG. 13 is different from the flowchart in FIG. 11 described above in that steps SUB, S14B, S18B, and S28B are changed to steps S12C, S14C, S18C, and S28C. Since other steps (steps identical in reference characters to the steps shown in FIG. 11 described above) have already been described, detailed description will not be repeated.

Controller 52 collects outputs (load L) from load sensor 59 in first cycles T1 (step S12C). Collected load L is stored in memory 54.

Then, controller 52 determines whether or not load L collected in first cycles T1 is higher than switching threshold value THs (step S14C). Switching threshold value THs can be set to load at which a sign of abnormality of bearings 5a and 5b is likely to appear.

When load L is larger than switching threshold value THs (YES in step S14C), controller 52 sets the sampling cycle to second cycle T2 shorter than first cycle T1 (step S16).

Then, controller 52 collects outputs (load L) from load sensor 59 and outputs (heat flux Q) from heat flux sensors 11a and 11b in second cycles T2 (step S18C). Collected load L and heat flux Q are stored in memory 54.

Controller 52 determines whether or not load L collected in second cycles T2 is lower than switching threshold value THs (step S28C). When load L is not lower than switching threshold value THs (NO in step S28C), controller 52 has the process return to step S16 and repeats processing in step S16 or later with the sampling cycle being maintained at second cycle T1. When load L is lower than switching threshold value THs (YES in step S28C), controller 52 has the process return to step S10 and repeats processing in step S10 or later with the sampling cycle being set back to first cycle T1 from second cycle T1.

FIG. 14 is a diagram showing exemplary relation among a sampling frequency (sampling cycles), load L, and rate of change D in heat flux in the present embodiment. The abscissa represents an operating time period (seconds). The upper field shows the sampling frequency (sampling cycles), the field in the middle shows load L, and the lower filed shows rate of change L) in heat flux.

At time 100 (seconds) when load L reaches switching threshold value THs, the sampling cycle is switched from one second (first cycle T1) to one millisecond (second cycle T2). At time 100 (seconds) or later, load L and heat flux Q are collected every one millisecond.

In the example shown in FIG. 14, at time 150 (seconds), load L becomes lower than switching threshold value THs without rate of change D in heat flux Q exceeding judgment threshold value THd at time 100 (seconds) or later. Therefore, the sampling cycle is set back to one second (first cycle T1) from one millisecond (second cycle T2). Collection of unnecessary data is thus suppressed.

According to such a modification as welt as in the embodiment described above, a sign of abnormality of bearings 5a and 5b can accurately be detected while an amount of collected data is minimized.

[Modification of Arrangement of Heat Flux Sensor]

Figure 15:
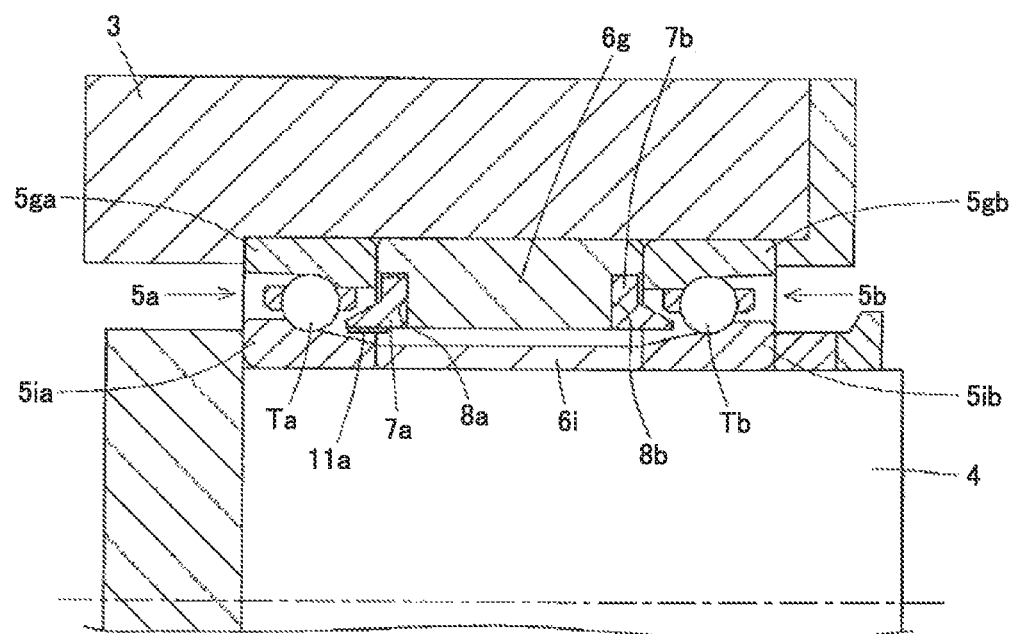
FIG. 15 is a diagram showing a modification of arrangement of a heat flux sensor.

FIG. 15 is a diagram showing a modification of arrangement of a heat flux sensor. In the present modification, as shown in FIG. 15, protrusions 7a and 7h that protrude from respective axial side surfaces into a gap between the inner ring and the outer ring are added in outer-ring spacer 6g on a fixed side, and heat flux sensor 11a is provided in one protrusion 7a. In this case, though not shown, heat flux sensor 11b may similarly be arranged also in another protrusion 7b.

Heat originates from a portion where a bearing ring on the fixed side of a rolling bearing comes in contact with a rolling element. In an example where the heat flux sensor is provided in the bearing ring on the fixed side, high cost for working the bearing ring on the fixed side is a concern. This problem is solved by providing a heat flux sensor in protrusions 7a and 7b of the spacer on the fixed side, and the heat flux sensor can readily be provided. Since heat flux sensors 11a and 11b are provided in protrusions 7a and 7b that protrude into the gap between the inner ring and the outer ring, variation in temperature in the inside of the bearing during operations can directly be detected.

Protrusions 7a and 7b may also serve as nozzles that emit lubricating oil for air-oil lubrication to bearings 5a and 5b. In this case, the heat flux sensor can be provided by making use of an existing nozzle that emits lubricating oil. Therefore, for example, cost can be lower than in an example in which a dedicated component for providing a heat flux sensor is provided.

Figure 16:
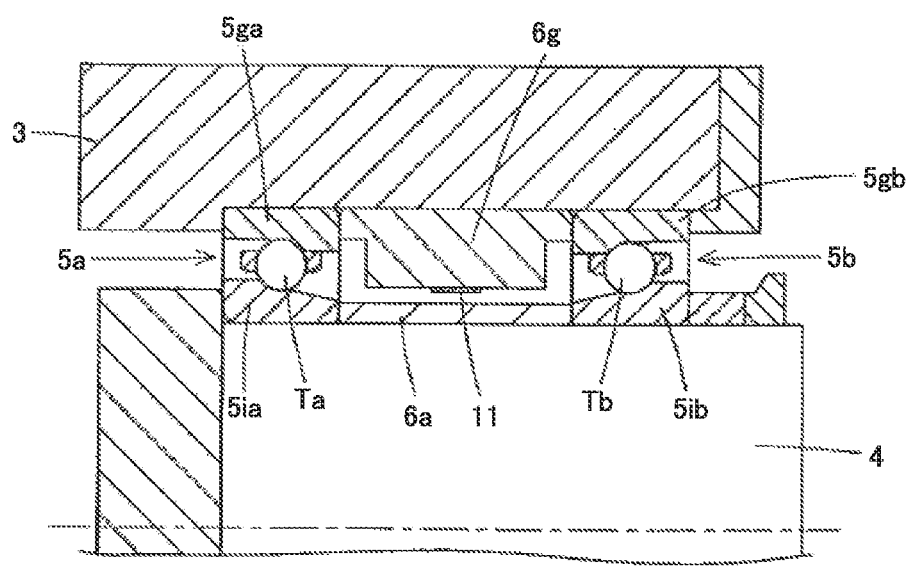
FIG. 16 is a diagram (No. 1) showing another modification of arrangement of the heat flux sensor.

FIG. 16 is a diagram showing another modification of arrangement of the heat flux sensor. FIG. 1 shows an example in which heat flux sensors 11a and 11b are provided at the end (in the vicinity of bearing 5) of the inside surface of outer-ring spacer 6g in the axial direction. As shown in FIG. 16, however, heat flux sensor 11 may be provided in the central portion of the inside surface of outer-ring spacer 6g in the axial direction.

Figure 17:
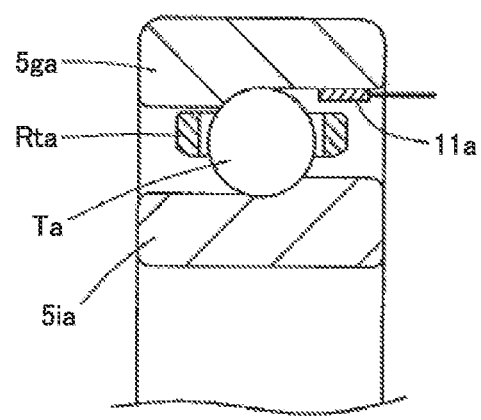
FIG. 17 is a diagram (No. 2) showing another modification of arrangement of the heat flux sensor.

FIG. 17 is a diagram showing another modification of arrangement of the heat flux sensor. As shown in FIG. 17, heat flux sensor 11a may be provided on the inside surface of outer ring 5ga. In this case, though not shown, heat flux sensor 11b may similarly be provided on the inside surface of outer ring 5gb.

[Modification of Detection of Sign of Abnormality of Bearing]

An example in which a sign of abnormality of the bearing is detected based on magnitude of heat flux Q or rate of change D (a time derivative value) in heat flux Q detected by heat flux sensors 11a and 11b is described in the embodiment above. A sign of abnormality of the bearing may be detected based on combination of heat flux Q detected by heat flux sensors 11a and 11b and another detection value.

For example, a sign of abnormality of the hearing may be detected based on a parameter such as correlation (followability) between heat flux Q and another detection value (rotation speed N, vibration, a temperature, a motor current value, preload, and external load) and a time integral value of heat flux Q. For example, whether or not there is a sign of abnormality of the bearing may be determined based on relation between rotation speed N and heat flux Q that follows the rotation speed.

Alternatively, relation between rotation speed N and heat flux Q may be monitored, and when relation therebetween becomes inconsistent, it may be determined that there is a sign of abnormality of the bearing. For example, when heat flux Q abruptly varies in spite of rotation speed N being constant and unchanged, it may be determined that there is a sign of abnormality of the bearing. Alternatively, for example, when heat flux Q does not follow rotation speed N while rotation speed N is varying, it may be determined that there is a sign of abnormality of the bearing.

Furthermore, abnormality diagnosis for detecting abnormality itself of the bearing in addition to detection of a sign of abnormality of the bearing may be made based on the parameter above. For example, when heat flux Q ©r rate of change D in heat flux exceeds a threshold value larger than Qth or Dth shown in FIG. 6, it may be determined that abnormality has occurred in the bearing. For example, when heat flux Q further increases also after damage prevention processing performed as a result of detection of the sign of abnormality of the bearing, the bearing may have been damaged and hence the bearing may be determined as being abnormal.

It should be understood that the embodiment disclosed herein is illustrative and non-restrictive in every respect. The scope of the present disclosure is defined by the terms of the claims rather than the description of the embodiment above and is intended to include any modifications within the scope and meaning equivalent to the terms of the claims.

REFERENCE SIGNS LIST 1 spindle apparatus; 2 bearing jacket; 3 housing; 4 main spindle; 5, 5a, 5b bearing; 5ga, 5gb outer ring; 5ia, 5ib inner ring; 6 spacer; 6g outer-ring spacer; 6 inside surface; 6i inner-ring spacer; 6iA outside surface; 7a, 7b protrusion; 11, 11a, 11b heat flux sensor; 30 bearing apparatus; 50 data collection apparatus; 51 input portion; 52 controller; 54 memory; 55 output portion; 56a, 56b temperature sensor; 57a, 57b vibration sensor; 58 rotation sensor; 59 load sensor

The invention claimed is:

1. A data collection apparatus that collects data on a mechanical apparatus, the data collection apparatus comprising:
   an input portion to which a result of detection by a sensor that detects a state of the mechanical apparatus is provided; and
   a controller configured to collect the result of detection by the sensor provided to the input portion in prescribed sampling cycles for storage, wherein
   the controller changes the sampling cycle in accordance with the result of detection by the sensor provided to the input portion,
   the mechanical apparatus includes a bearing apparatus including a bearing including an inner ring and an outer ring,
   the sensor includes a first sensor that detects a heat flux in the bearing or in vicinity of the bearing based on a Seebeck effect,
   the controller changes the sampling cycle in accordance with the result of detection by the first sensor,
   when a magnitude of the result of detection by the first sensor collected in first cycles is larger than a corresponding switching threshold value, the controller changes the sampling cycle to a second cycle shorter than the first cycle and collects the result of detection by the first sensor in the second cycles, and
   when a rate of change of the result of detection by the first sensor collected in the second cycles is larger than a corresponding judgment threshold value, the controller performs processing for preventing damage to the bearing apparatus.

2. The data collection apparatus according to claim 1, wherein
   the processing for preventing damage to the bearing apparatus includes at least any of processing for stopping rotation of the inner ring or the outer ring, processing for reducing a rotation speed of the inner ring or the outer ring, and processing for cooling the bearing apparatus.

3. The data collection apparatus according to claim 1, wherein
   when at least one of the magnitude and the rate of change of the result of detection by the first sensor collected in the second cycles is smaller than the corresponding switching threshold value, the controller sets the sampling cycle back to the first cycle from the second cycle.

4. The data collection apparatus according to claim 1, wherein
   the sensor includes, in addition to the first sensor, at least one of a load sensor that detects preload applied to the bearing and load from outside and a rotation speed sensor that detects a rotation speed of the inner ring or the outer ring, and when a result of detection by at least one of the load sensor and the rotation speed sensor collected in first cycles exceeds a corresponding switching threshold value, the controller changes the sampling cycle to a second cycle shorter than the first cycle and collects the result of detection by the first sensor in the second cycles.

5. The data collection apparatus according to claim 4, wherein when at least one of magnitude and a rate of change of the result of detection by the first sensor collected in the second cycles is larger than a corresponding judgment threshold value, the controller performs processing for preventing damage to the bearing apparatus.

6. The data collection apparatus according to claim 5, wherein the processing for preventing damage to the bearing apparatus includes at least any of processing for stopping rotation of the inner ring or the outer ring, processing for reducing the rotation speed of the inner ring or the outer ring, and processing for cooling the bearing apparatus.

7. The data collection apparatus according to claim 4, wherein the controller collects the result of detection by at least one of the load sensor and the rotation speed sensor in the second cycles, and when the result of detection by at least one of the load sensor and the rotation speed sensor collected in the second cycles is smaller than the corresponding switching threshold value, the controller sets the sampling cycle back to the first cycle from the second cycle.

8. The data collection apparatus according to claim 1, wherein the bearing apparatus rotatably supports a main spindle of a machine tool.

9. A data collection apparatus that collects data on a mechanical apparatus, the data collection apparatus comprising:

an input portion to which a result of detection by a sensor that detects a state of the mechanical apparatus is provided; and a controller configured to collect the result of detection by the sensor provided to the input portion in prescribed sampling cycles for storage, wherein the controller changes the sampling cycle in accordance with the result of detection by the sensor provided to the input portion, the mechanical apparatus includes a bearing apparatus including a bearing including an inner ring and an outer ring, the sensor includes a first sensor that detects a heat flux in the bearing or in vicinity of the bearing based on a Seebeck effect, and a rotation speed sensor that detects a rotation speed of the inner ring or the outer ring, when a magnitude of the result of detection by the rotation speed sensor collected in first cycles is larger than a corresponding switching threshold value, the controller changes the sampling cycle to a second cycle shorter than the first cycle and collects the result of detection by the first sensor in the second cycles, and when a rate of change of the result of detection by the first sensor collected in the second cycles is larger than a corresponding judgment threshold value, the controller performs processing for preventing damage to the bearing apparatus.

10. A data collection apparatus that collects data on a mechanical apparatus, the data collection apparatus comprising:

an input portion to which a result of detection by a sensor that detects a state of the mechanical apparatus is provided; and a controller configured to collect the result of detection by the sensor provided to the input portion in prescribed sampling cycles for storage, wherein the controller changes the sampling cycle in accordance with the result of detection by the sensor provided to the input portion, the mechanical apparatus includes a bearing apparatus including a bearing including an inner ring and an outer ring, the sensor includes a first sensor that detects a heat flux in the bearing or in vicinity of the bearing based on a Seebeck effect, and a load sensor that detects preload applied to the bearing and load from outside, when a magnitude of the result of detection by the load sensor collected in first cycles is larger than a corresponding switching threshold value, the controller changes the sampling cycle to a second cycle shorter than the first cycle and collects the result of detection by the first sensor in the second cycles, and when a rate of change of the result of detection by the first sensor collected in the second cycles is larger than a corresponding judgment threshold value, the controller performs processing for preventing damage to the bearing apparatus.

* * * * *